United States Patent Office 3,849,494
Patented Nov. 19, 1974

3,849,494
TRIFLUOROMETHYLBENZOPHENONE O-ACYL-OXIMES USEFUL AS CROP YIELD INCREASERS FOR PLANTS
William Joseph Middleton, Chadds Ford, Pa., assignor to E. I. du Pont de Nemours and Company, Wilmington, Del.
No Drawing. Filed Jan. 18, 1973, Ser. No. 324,878
Int. Cl. C07c *131/00*
U.S. Cl. 260—566 AE    8 Claims

ABSTRACT OF THE DISCLOSURE

Certain trifluoromethylbenzophenone O-acyloximes are crop yield increasers for plants. Exemplary is 4-trifluoromethylbenzophenone O-acetyloxime.

BACKGROUND OF THE INVENTION

Field of the Invention

This invention relates to trifluoromethylbenzophenone O-acyloximes and their use as crop yield increasers for plants.

Prior Art

The unacylated 2- and 3-trifluoromethylbenzophenone oximes are known [Lichtenberger & Weiss, Bull. Soc. Chim., France, 587 (1962); Chem. Abs., 57, 2126 (1963)]. 4-trifluoromethylbenzophenone oxime is disclosed in words in Chem. Abs. Cumulative Index for 1962–66, AMN–BE volume, p. 3193S, but this index disclosure is erroneous. It concerns the above Lichtenberger & Weiss reference, which does not mention 4-trifluoromethylbenzophenone or its oxime. 4-trifluoromethylbenzophenone, however, is known [Rossi & Butta, Chem. Abs., 56, 12895 (1962)]. 4-Methoxy-4'-trifluoromethylbenzophenone oxime is known [Buu-Hoi et al., Rec. Trav. Chim., 85, 367 (1966)]. Benzophenone O-acetyloxime is known [Exner, Chem. Listy, 48, 1634 (1954)]. The oximes per se are generally less stable than the acylated derivatives and are not known to exhibit crop yield increasing effects on plants.

SUMMARY OF THE INVENTION

The novel compounds include trifluoromethylbenzophenone O-acyloximes, including *syn*- and *anti*-isomers and mixtures thereof, of the formula

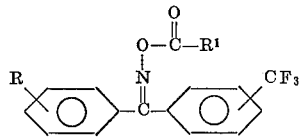

wherein R is hydrogen, methyl, trifluoromethyl or methoxy, $R^1$ is phenyl, alkyl of 1 to 11 carbons, haloalkyl of 1 to 11 carbons, phenylamino, or alkylamino of 1 to 3 carbons, and the R and $CF_3$ groups each can be in the ortho, meta or para positions. Preferred are those compounds where R=H and the $CF_3$ group is in the para position, i.e., the acyloximes of 4-trifluoromethylbenzophenone.

The oxime precursors of the compounds of formula I are obtained conventionally by reaction of the appropriate trifluoromethylbenzophenone with hydroxylamine hydrochloride in a suitable solvent and the presence of a base.

The trifluoromethylbenzophenone O-acyloximes of formula I in which R is alkyl or phenyl are obtained conventionally by reaction of the corresponding oxime with the appropriate carboxylic acid chloride or anhydride in a suitable solvent. The O-acyloximes in which R is alkylamino or phenylamino are obtained by reaction of the corresponding oxime with the appropriate alkyl isocyanate or phenyl isocyanate in a suitable ether solvent.

Representative trifluoromethylbenzophenone O-acyloximes of the invention correspond to compounds of formula I having the R and $R_1$ groups given in the following table. These compounds include the *syn*- and *anti*-isomers and mixtures thereof, and it is understood that the R and $CF_3$— groups each may be in the ortho, meta or para position.

| R: | $R_1$: |
|---|---|
| Hydrogen | Methyl |
| Methyl | Propyl |
| Hydrogen | Isopropyl |
| Methoxy | Pentyl |
| Trifluoromethyl | Heptyl |
| Hydrogen | Octyl |
| Methyl | Decyl |
| Methoxy | Chloromethyl |
| Trifluoromethyl | Trifluoromethyl |
| Hydrogen | 2-bromoethyl |
| Methoxy | Chloropentyl |
| Hydrogen | Iodooctyl |
| Hydrogen | Chloroundecyl |
| Methoxy | Propylamino |
| Hydrogen | Anilino |

The trifluoromethylbenzophenone-O-acyloximes of the invention are useful as crop yield increasers for plants. For example, they enhance the production capacity of soybeans as evidenced by increased amounts of pods and seeds obtained from plants which have been treated with aqueous suspensions of such O-acyloximes.

SPECIFIC EMBODIMENTS OF THE INVENTION

The following examples illustrate the preparation and physical properties of representative novel trifluoromethylbenzophenone O-acyloximes and their use as senescence inhibitors for plants. In these examples temperatures are given in degrees centigrade except where otherwise indicated.

Example 1.—4-Trifluoromethylbenzophenone Oxime

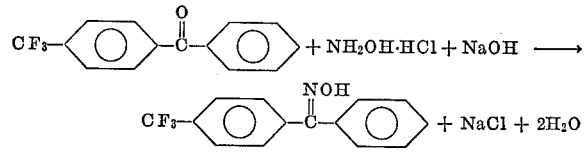

To a mixture of 50 g. (0.20 mole) of 4-trifluoromethylbenzophenone, 30 g. of hydroxylamine hydrochloride, 100 ml. of ethanol and 45 ml. of water was added, with stirring and cooling, 55 g. of powdered sodium hydroxide. The mixture was refluxed 5 minutes, cooled and poured into a solution of 150 ml. of concentrated hydrochloric acid in 1 liter of water. The product was filtered off, washed with water and vacuum dried over $P_2O_5$, to give 52.8 g. (99.5%) of 4-trifluoromethylbenzophenone oxime as a white powdery solid: m.p. 120–155° C.; $^{19}F$ NMR [$(CD_3)_2CO$] $\delta$ —62.5 p.p.m. (s) overlapping multiplet at 0.7 Hz. higher field.

Example 2.—4-Trifluoromethylbenzophenone O-Acetyloxime

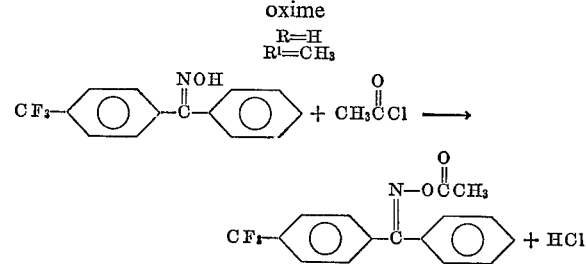

To a solution of 2.65 g. (0.01 mole) of 4-trifluoromethylbenzophenone oxime in 10 ml. of diethyl ether was added 1.0 g. (0.013 mole) of acetyl chloride. The solution was stirred 1 hour at room temperature, then added to 20 g. of ice. The ether was evaporated after the ice had melted. The solid which formed was filtered off, washed with water and dried over P₂O₅. The crude product was recrystallized from n-heptane to give 1.7 g. (55%) of 4-trifluoromethylbenzophenone O-ocetyloxime as white crystals: m.p., 165–170° C. (with some decomposition); IR (KBr) 5.61μ (>C=O), 6.17μ (>C=N); ¹H NMR (CH₂Cl₂) δ 7.47 p.p.m. (m, 9H), δ 2.02 p.p.m. (s, 3H), δ 1.57 p.p.m. (impurity, 0.5H).

*Analysis.*—Calcd. for C₁₆H₁₂NO₂F₃: C, 62.54; H, 3.94; N, 4.56; F, 18.76 (M.W., 307.28). Found: C, 62.15; H, 3.69; N, 4.60.

In a separate experiment, 170 g. (2.17 mole) of acetyl chloride was added dropwise to a solution of 450 g. (1.70 mole) of 4-trifluoromethylbenzophenone oxime in 1.5 liter of ether. The mixture was stirred for 1 hour, during which time a precipitate slowly formed. This was filtered off, washed with water and small amounts of ether, and dried in vacuum over P₂O₅. The crude product was purified by washing with dilute sodium hydroxide, followed by water until the wash water was neutral, then dried over P₂O₅ under vacuum. There was obtained 460 g. (88.2%) of 4-trifluoromethylbenzophenone O-acetyloxime as a white solid: m.p., 168–171° C.; ¹⁹F NMR (CHCl₃) δ −63.3 p.p.m. (m, J=0.5 Hz.); ¹H NMR (CH₂Cl₂) δ 2.08 p.p.m. (s, 3H), δ 7.6 p.p.m. (m, 9H).

*Analysis.*—Calcd. for C₁₆H₁₂NO₂F₃: C, 62.54; H, 3.94; N, 4.56; F, 18.76. Found: C, 62.60; H, 3.95; N, 4.73; F, 18.60.

Example 3.—4-Trifluoromethylbenzophenone O-Propionyloxime

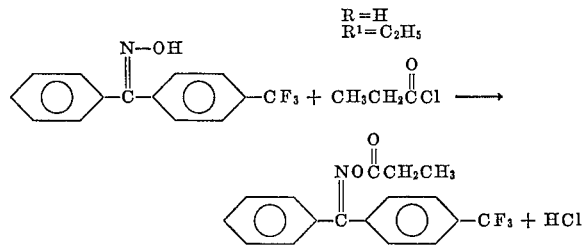

To a solution of 10 g. (0.038 mole) of 4-trifluoromethylbenzophenone oxime in 45 ml. of ether was added 3.5 g. (0.038 mole) of propionyl chloride. The mixture was allowed to stand for 1 hour at room temperature. The ether was evaporated and the residue washed with water, dried and recrystallized from n-heptane. The product was washed with 5% aqueous NaOH and water, then dried to give 6.3 g. (52%) of 4-trifluoromethylbenzophenone O-propionyloxime as an off-white solid: m.p., 118–123° C.; ¹H NMR (DMSO-d₆) δ 1.03 p.p.m. (t, 3H), δ 2.42 p.p.m. (quartet, J=7.9 Hz., 2H), δ 7.77 p.p.m. (m, 9H); ¹⁹F NMR (DMSO-d₆) δ −61.0 p.p.m. (s).

*Analysis.*—Calcd. for C₁₇H₁₄NO₂F₃: C, 63.55; H, 4.39; N, 4.36; F, 17.74 (M.W., 321.30). Found: C, 63.66; H, 4.33; N, 4.59; F, 17.80.

Example 4.—4-Trifluoromethylbenzophenone O-Heptanoyloxime

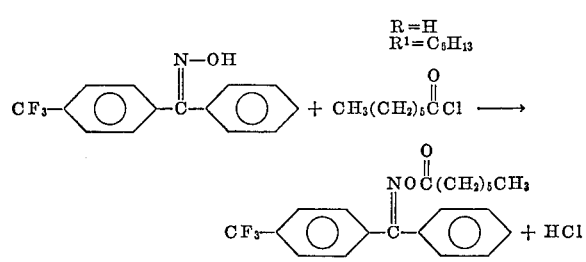

Heptanoyl chloride (5.6 g., 0.038 mole) was added dropwise to a solution of 10.0 g. (0.038 mole) of 4-trifluoromethylbenzophenone oxime in 30 ml. of ether. The solution was stirred overnight at room temperature. The ether was evaporated and water added. The product, which solidified slowly when chilled, was filtered off, washed with water and dried to yield 12.4 g. (87%) of 4-trifluoromethylbenzophenone O-heptanoyloxime as an off-white solid: m.p., 80–84° C.; ¹⁹F NMR (DMSO-d₆) δ −61.1 p.p.m. (m, J=ca. 0.5 Hz.); ¹H NMR (DMSO-d₆), δ 7.45 p.p.m. (m, 9H), δ 2.28 p.p.m. (m, 2H), δ 1.25 p.p.m. (m, 8H), δ 0.85 p.p.m. (m, 3H); IR (KBr) 5.65μ (>C=O).

*Analysis.*—Calcd. for C₂₁H₂₂NO₂F₃: C, 66.83; H, 5.88; N, 3.71; F, 15.10 (M.W., 377.41). Found: C, 66.20; H, 5.65; N, 3.58; F, 15.14.

Example 5.—4-Trifluoromethylbenzophenone O-Benzoyloxime

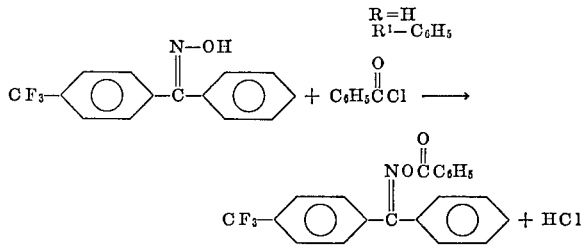

To a solution of 10 g. (0.038 mole) of 4-trifluoromethylbenzophenone oxime in 25 ml. of diethyl ether was added dropwise 5.4 g. (0.038 mole) of benzoyl chloride. The solution was stirred overnight at room temperature. The ether was evaporated and the product washed with 5% aqueous sodium hydroxide and water and dried to yield 12.2 g. (87%) of 4-trifluoromethylbenzophenone O-benzoyloxime as a white solid: m.p., 114–120° C.; ¹⁹F NMR (CDCl₃) δ −63.2 p.p.m. (s, 87%), δ −63.3 p.p.m. (m, 13%); IR (KBr) 5.70μ (>C=O).

*Analysis.*—Calcd. for C₂₁H₁₄NO₂F₃: C, 68.29; H, 3.82; N 3.79; F, 15.43 (M.W., 369.34). Found: C, 67.87; H, 3.48; N, 3.83; F, 15.47.

Example 6.—4-Trifluoromethylbenzophenone O-(N-Methylcarbamoyl)Oxime

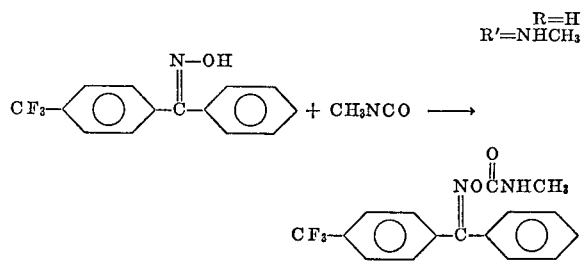

A solution of 10 g. (0.038 mole) of 4-trifluoromethylbenzophenone oxime, 1.6 g. (0.028 mole) of methyl isocyanate and 30 ml. of diethyl ether was allowed to stand at room temperature for 48 hours under a stream of nitrogen, during which time a solid slowly formed. The ether was partially evaporated and CCl₃F was added to precipitate the product, which was filtered off and dried to give 5.0 g. (55% based on methyl isocyanate) of 4-trifluoromethylbenzophenone O-(N-methylcarbamoyl)oxime as a white solid: m.p., 191–193° C.; ¹H NMR

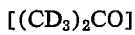

δ 7.7 p.p.m. (m, 9H), δ 7.1 p.p.m. (broad signal, 1H), δ 2.88 p.p.m. (d, J=4.8 Hz., 3H), δ 2.75 p.p.m. (minor impurity); ¹⁹F NMR [(CD₃)₂CO] δ −63.7 p.p.m. (s).

*Analysis.*—Calcd. for C₁₆H₁₃N₂O₂F₃: C, 59.63; H, 4.07; N, 8.69; F, 17.68 (M.W., 322.29). Found: C, 58.98; H, 4.09; N, 8.51; F, 17.94.

Example 7.—4-Trifluoromethylbenzophenone O-(N-Phenylcarbamoyl)Oxime

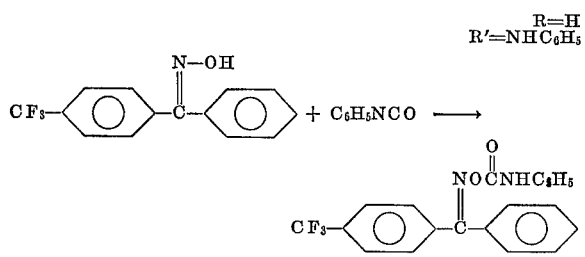

A solution of 4.5 g. (0.038 mole) of phenyl isocyanate, 10 g. (0.038 mole) of 4-trifluoromethylbenzophenone oxime and 25 ml. of ether was stirred overnight at room temperature. After about 30 minutes the reaction mixture became a slurry of white solid and liquid. The product was filtered off, washed with a small amount of ether and water. A second fraction was obtained by filtering the filtrate. Both fractions were dried in vacuum. They were further purified by washing with 5% aqueous NaOH, water, and drying.

Fraction 1: 10 g. of 4 - trifluoromethylbenzophenone O-(N-phenylcarbamoyl)oxime, off-white solid, m.p., 131–143° C.; $^1$H NMR (DMSO-$d_6$) $\delta$ 9.80 p.p.m. and $\delta$ 9.74 p.p.m. (singlets, combined area 1H), $\delta$ 7.54 p.p.m. (m, 14H); $^{19}$F NMR (DMSO-$d_6$) $\delta$ —61.1 p.p.m. and $\delta$ —61.0 p.p.m. (multiplets, 40:60 ratio).

*Analysis.*—Calcd. for $C_{21}H_{15}N_2O_2F_3$: C, 65.62; H, 3.93; N, 7.29; F, 14.83 (M.W., 384.36). Found: C, 65.51; H, 3.91; N, 7.14; F, 14.92.

Fraction 2: 3.6 g. of 4-trifluoromethylbenzophenone O-(N-phenylcarbamoyl)oxime, off-white solid, m.p., 134–144° C.; $^1$H NMR (DMSO-$d_6$) $\delta$ 9.83 p.p.m. and 9.73 p.p.m. (singlets, combined area 1H), $\delta$ 7.58 p.p.m. (m, 14H); $^{19}$F NMR (DMSO-d[) $\delta$ —60.9 p.p.m. and $\delta$ —60.8 p.p.m. (multiplets, ratio 15:85).

*Analysis.*—Calcd. for $C_{21}H_{15}N_2O_2F_3$: C, 65.62; H, 3.93; N, 7.29; F, 14.83 (M.W., 384.36). Found: C, 65.03; H, 3.92; N, 6.80; F, 14.85.

Example 8.—2-Trifluoromethylbenzophenone O-Acetyloxime

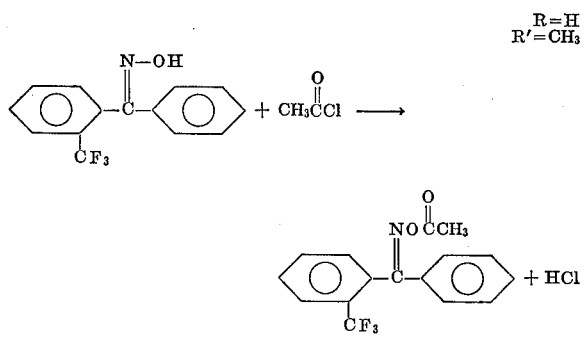

To a solution of 2.0 g. (0.0076 mole) of 2-trifluoromethylbenzophenone oxime in 10 ml. of ether was added dropwise an excess of acetyl chloride at room temperature. The ether was evaporated, the residue washed with water and dried. The crude product was recrystallized from n-hexane using dicolorizing carbon, to give 1.24 g. (53.2%) of 2 - trifluoromethylbenzophenone O-acetyloxime as a white crystalline solid: m.p., 74.5–79.5° C.; $^{19}$F NMR $(CDCl_3)$ $\delta$ —61.2 p.p.m. (m); $^1$H NMR (CDCl$_3$) $\delta$ 7.4 p.p.m. (m, 9H), $\delta$ 1.98 p.p.m. (s, 3H).

*Analysis.*—Calcd. for $C_{16}H_{12}NO_2F_3$: C, 62.54; H, 3.94; N, 4.56; F, 18.55 (M.W., 307.28). Found: C, 62.58; H, 3.96; N, 4.60; F, 18.83.

Example 9.—4-Methoxy-4'-Trifluoromethylbenzophenone O-Acetyloxime

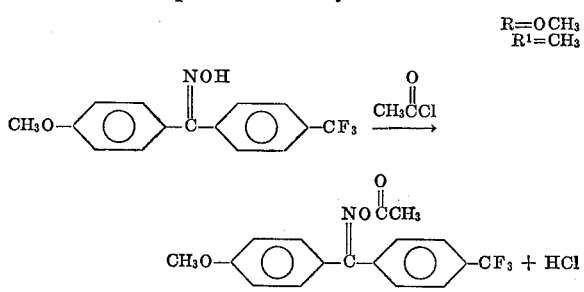

To a solution of 10 g. (0.035 mole) of 4-methoxy-4'-trifluoromethylbenzophenone oxime in 50 ml. of diethyl ether was added dropwise 2.7 g. (9.034 mole) of acetyl chloride at 22 to 282° C. A solid slowly formed. The mixture was stirred for 1 hour and cooled. The solid was filtered off, washed with ether and water and vacuum-dried over $P_2O_5$. There was obtained 9.4 g. (82.5%) of 4-methoxy - 4' - trifluoromethylbenzophenone O-acetyloxime as a white solid: m.p., 127–140° C.; $^1$H NMR $[(CD_3)_2CO]$ $\delta$ 7.65 p.p.m. (m, 8H), $\delta$ 3.89 p.p.m. (s, 3H), $\delta$ 2.04 p.p.m. (s, 3H); $^{19}$F NMR $[(CD_3)_2CO]$ $\delta$ —62.2 p.p.m. (m, 95%), $\delta$ 62.0 p.p.m. (s, 5%).

*Analysis.*—Calcd. for $C_{17}H_{14}NO_3F_3$: C, 60.54; H, 4.18; N, 4.15; F, 16.90 (M.W., 337.20). Found: C, 59.89, 59.66; H, 4.02, 4.15; N, 3.97, 4.01; F, 17.15.

Example 10.—4-Trifluoromethylbenzophenone O-Chloroacetyloxime

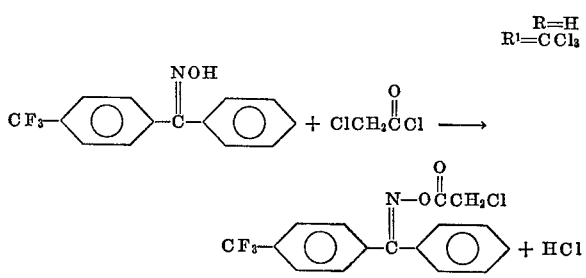

To 10 g. (0.038 mole) of 4 - trifluoromethylbenzophenone oxime in 50 ml. of ether was added 4.35 g. (0.038 mole) of chloroacetyl chloride. The ether solution was washed with 25 ml. of cold water, dried over magnesium sulfate, and evaporated to dryness. The solid was recrystallized from carbon tetrachloride, yielding 4.74 g. (35%) of 4 - trifluoromethylbenzophenone O - chloroacetyloxime, m.p. 103–110° C., $^1$H NMR $[(CD_3)_2CO/TMS]$:

$\delta$ 4.27 p.p.m. (s, 2H), $\delta$ 7.6 p.p.m. (m, 9H); $^{19}$F NHR $[(CD_3)_2CO]$: $\delta$ 64.0 p.p.m. (m).

*Analysis.*—Calcd. for $C_{16}H_{11}ClF_3NO_2$: C, 56.24; H, 3.24; N, 4.10. Found: C, 55.93, 55.72; H, 2.79, 2.94; N, 4.07, 3.79.

Example 11.—4-Trifluoromethylbenzophenone O-Trichloroacetyloxime

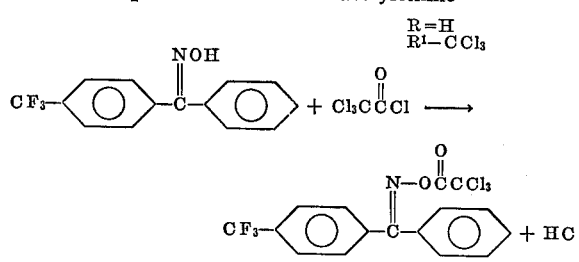

To a solution of 5.3 g. (0.02 mole) of 4-trifluoromethylbenzophenone oxime in 50 ml. of ether was added 3.7 g. (0.02 mole) of trichloroacetyl chloride. The solution was evaporated to dryness, yielding 6.5 g. of 4-trifluoromethylbenzophenone O-trichloroacetyloxime, m.p. 92–102° C., $^1$H NMR (CDCl$_3$/TMS), $\delta$ 7.5 p.p.m. (m).

Analysis.—Calcd. for $C_{16}H_9F_3Cl_3NO_2$: C, 46.80; H, 2.21; N, 3.41. Found: C, 46.46; H, 2.26; N, 3.17, 3.19.

Example A

This example illustrates the crop yield increasing effect of 4-trifluoromethylbenzophenone O-acetyloxime on soybeans when applied to the foliage.

Soybeans were grown in a mixture of equal parts of vermiculite, peat and gravel in four pots in a controlled environment growth room, each pot containing two plants. The environment was a 12-hour photoperiod with 4300 ft.-c., temperature 75° F. day and 64° F. night, and a continuous relative humidity of 75%. A suspension of 4-trifluoromethylbenzophenone O-acetyloxime was applied as a foliar spray to run-off and as a soil drench treatment at the early flowering stage of development. The elapsed time from treatment to harvesting was 55 days. The treatment caused an increase in the number of pods and an increase in the number and weight of seeds per plant when compared to the untreated control. The following results were obtained:

| Treatment | Rate, lb./acre | No. of Pods/pot | No. of Seeds/pot | Dry wt. seeds/pot (g.) |
|---|---|---|---|---|
| 4-trifluoromethyl-benzophenone O-acetyloxime | 1/16 | 90.5 | 156.7 | 29.65 |
|  | 1/8 | 94.2 | 165.3 | 33.97 |
|  | 1/2 | 94.0 | 146.7 | 35.35 |
| Untreated control |  | 81.0 | 138.0 | 27.80 |

Example B

This example illustrates the crop yield increasing effect of 4-trifluoromethylbenzophenone O-acetyloxime on field-grown wheat when applied to the soil.

A field of sown wheat, Blue Boy variety, was divided into identical plots of 60 square feet inch. 4-trifluoromethylbenzophenone O-acetyloxime was applied to the soil at a rate of 4 pounds per acre in four of the plots when the wheat was at the root stage of development. Four additional plots were left untreated, as controls. The plots were harvested for seed yield after about eight weeks, i.e., at maturity. The following results were obtained.

| | Bushels/acre | Percent of control |
|---|---|---|
| Plots: | | |
| Control | 45.1 | 100 |
| Treated | 52.9 | 117 |

The embodiments of the invention in which an exclusive property or privilege is claimed are defined as follows:

1. A compound of the formula

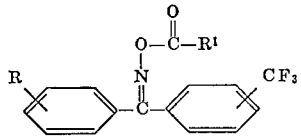

wherein
R is H, methyl, trifluoromethyl or methoxy; and
R$^1$ is phenyl, alkyl or haloalkyl of up to 11 carbon atoms.

2. A compound according to claim 1 in which R=H and the CF$_3$ group is in the para position.

3. The compound of claim 2 in which R=H and R$^1$=CH$_3$; 4-trifluoromethylbenzophenone O-acetyloxime.

4. The compound of claim 2 in which R=H and R$^1$=C$_2$H$_5$; 4-trifluoromethylbenzophenone O-propionyloxime.

5. The compound of claim 2 in which R=H and R$^1$=C$_6$H$_{13}$; 4-trifluoromethylbenzophenone O-heptanoyloxime.

6. The compound of claim 2 in which R=H and R$^1$=C$_6$H$_5$; 4-trifluoromethylbenzophenone O-benzoyloxime.

7. The compound of claim 1 in which R=H and R$^1$=CH$_3$; 2-trifluoromethylbenzophenone O-acetyloxime.

8. The compound of claim 1 in which R=OCH$_3$ and R$^1$=CH$_3$; 4-methoxy-4'-trifluoromethylbenzophenone O-acetyloxime.

References Cited

UNITED STATES PATENTS

| 3,169,989 | 2/1965 | Tieman et al. | 260—566 AE |
| 3,503,732 | 3/1970 | Cahoy | 260—566 AE |
| 3,733,359 | 5/1973 | Hubele | 260—566 AE |

OTHER REFERENCES

Chemical Abstracts, vol. 56, column 12,895 (1962).

LEON ZITVER, Primary Examiner

G. A. SCHWARTZ, Assistant Examiner

U.S. Cl. X.R.

71—121; 260—566 AE